A. R. PRIBIL.
SHOCK ABSORBER.
APPLICATION FILED FEB. 18, 1914.

1,280,295.

Patented Oct. 1, 1918.
3 SHEETS—SHEET 1.

WITNESSES:

INVENTOR.
BY
ATTORNEYS.

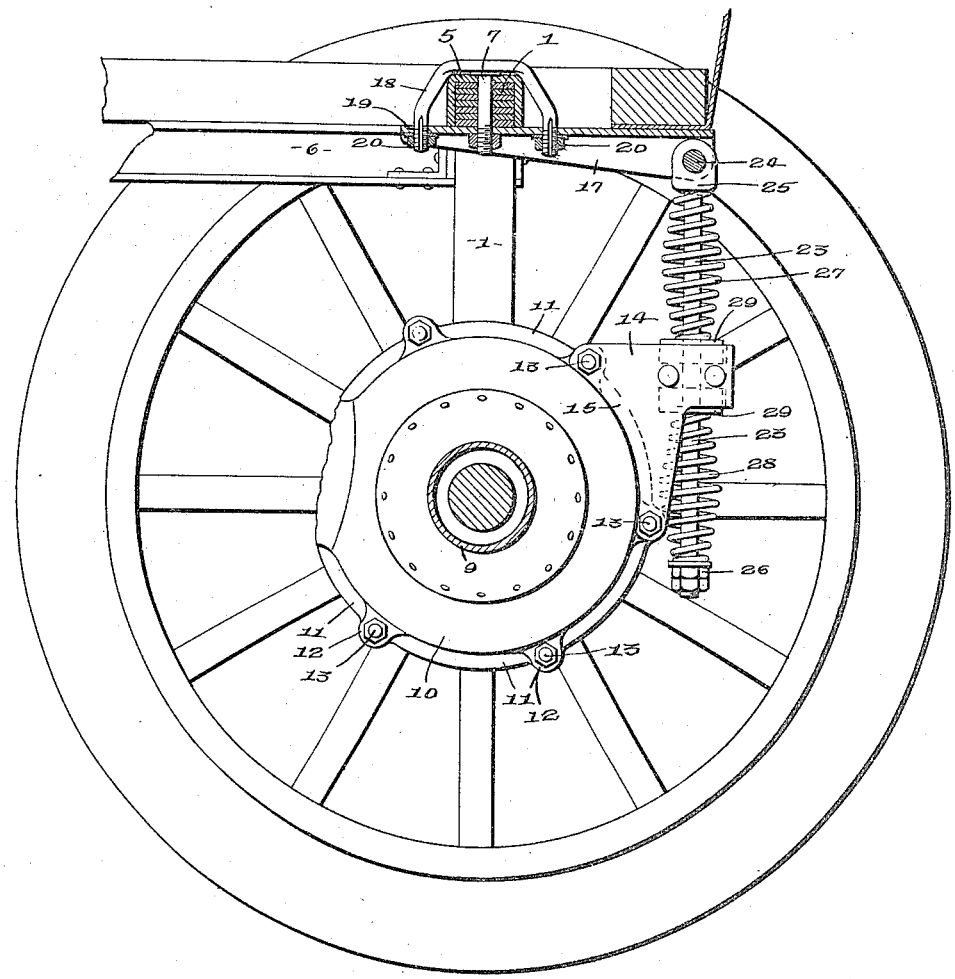

A. R. PRIBIL.
SHOCK ABSORBER.
APPLICATION FILED FEB. 18, 1914.
1,280,295.
Patented Oct. 1, 1918.
3 SHEETS—SHEET 3.
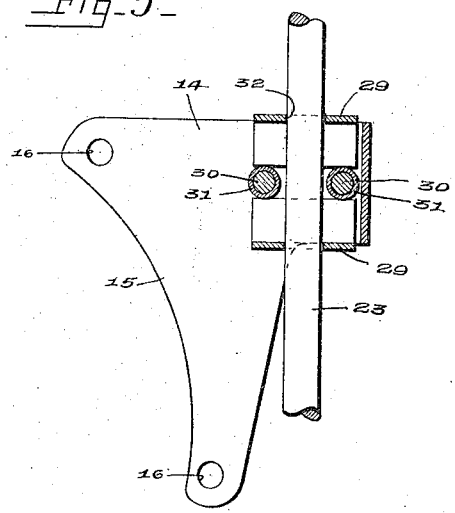
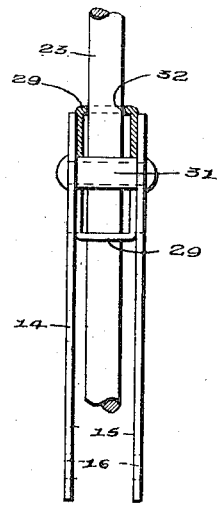
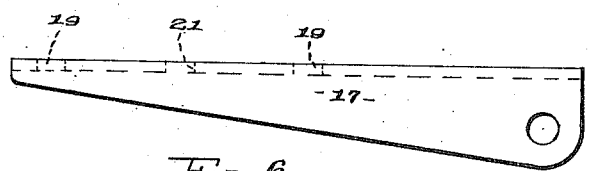
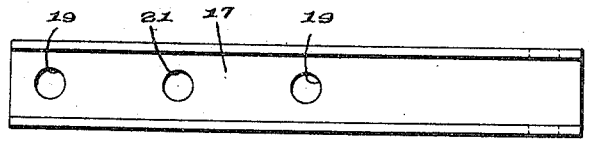
WITNESSES:
INVENTOR.
BY
ATTORNEYS

UNITED STATES PATENT OFFICE.

ALEXIS R. PRIBIL, OF DETROIT, MICHIGAN, ASSIGNOR TO GEORGE W. BOWEN, OF AUBURN, NEW YORK.

SHOCK-ABSORBER.

1,280,295.    Specification of Letters Patent.    Patented Oct. 1, 1918.

Application filed February 18, 1914. Serial No. 819,425.

*To all whom it may concern:*

Be it known that I, ALEXIS R. PRIBIL, a citizen of the United States, and a resident of Detroit, in the county of Wayne and State of Michigan, have invented a new and useful Shock-Absorber, of which the following is a specification.

This invention has for its object the production of a shock absorber particularly applicable for motor vehicles having a three point suspension spring, that is, a spring extending transversely of the vehicle and connected at its opposite ends to the running gear and intermediate to the ends of the body of the vehicle; and the invention consists in the novel combinations and constructions hereinafter set forth and claimed.

In describing this invention, reference is had to the accompanying drawings, in which like characters designate corresponding parts in all the views.

Figure 1 is a rear elevation of a motor car embodying my invention, parts being omitted.

Fig. 2 is an enlarged sectional view on line A—A, Fig. 1.

Fig. 3 is an enlarged sectional view through the bracket connected to the differential gear casing, contiguous parts being also shown.

Fig. 4 is an elevation, partly in section, looking to the right in Fig. 3.

Figs. 5 and 6 are detail views of the bracket connected to the body of the vehicle.

Figure 1:
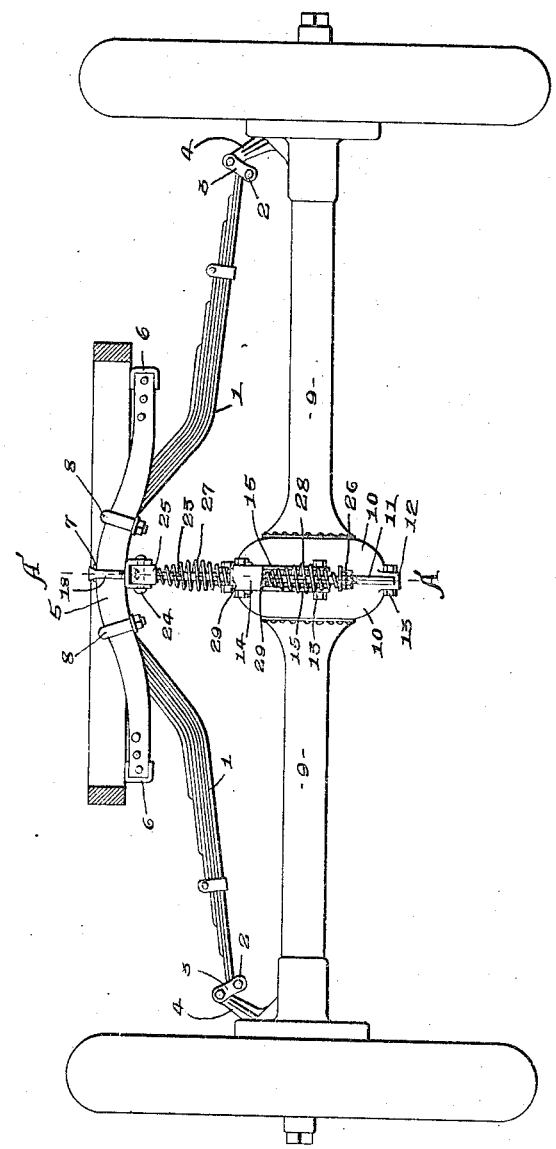

1 is the spring which extends transversely of the vehicle above the rear axle and which is connected at its opposite ends to the running gear, as the rear axle unit, and intermediate of its ends to the body of the vehicle.

I have here shown my invention as applied to a Ford car in which the spring 1 is connected at its opposite ends at 2 to shackles 3 pivoted to brackets 4 carried at the opposite ends of the rear axle, and is fixed intermediate of its ends to a channel bar or spring seat 5 rigidly secured to the body or chassis 6, it being secured to said spring seat by a bolt 7 extending transversely through the spring and by clips 8 extending around the spring seat 5 and the intermediate portion of the spring 1.

The rear axle construction includes the usual casings 9 inclosing the live shaft sections of the axle and the sections 10 of the differential gear casing, the latter being located between opposing ends of the casings 9. The sections 10 of the differential gear casing have lapping peripheral flanges and lugs 11 and 12 and are secured together by bolts 13 extending transversely through the lugs 12.

The foregoing constructions in themselves form no part of my invention.

The shock absorbing means is located between the ends of the spring 1 and usually centrally of the vehicle in a transverse direction, and is connected to the axle and to the body or portion of the spring rigid with the body, and includes a bracket connected to the axle, a bracket for connection to the car body, and shock preventing means connecting the brackets. The shock preventing means preferably includes members arranged to prevent direct shocks as well as indirect, as those due to rebound of the spring.

14 designates the bracket connected to the axle, and here shown as mounted on the differential gear casing and having side flanges 15, which lap the flanges and lugs 11 and 12 of the sections 10 of the differential gear casing, the flanges 15 being formed with openings 16 designed to come into alinement with the bolt openings through the flanges and lugs 11 and 12 which said flanges lap, in order to be secured in position by the bolts 13. The edges of the flanges 15 are concave to conform to the curvature of the differential gear casing. The bracket 14 is preferably located on the rear side of the differential gear casing.

17 designates the bracket secured to the body or chassis 6 and fixed relatively to the body frame and the central part of the spring 1, the bracket 17 being here shown in the form of a channel and extending under the intermediate part of the spring 1 with the bottom of its channel engaging the underside of the spring and the lower edges of the spring seat 6, and with its channel facing downwardly. The bracket 17 is fixedly secured relatively to the spring and spring seat by a clip 18 embracing the spring seat and extending at its opposite ends through suitable holes 19 in the brackets 17 and on which turn nuts 20 against the inner face of the bottom of the channel. In placing the bracket 17 in position, the nut of the bolt 7 is removed, the projecting end of the bolt 7 passed through a perforation 21 in the bracket and the nut replaced.

The shock and rebound preventing means comprises a rod 23 and springs acting in opposite directions on the rod and the bracket 14. The rod is pivoted at 24 at its upper end between the sides of the bracket 17 and extends downwardly through a passage formed in the bracket 14, the rod having a shoulder 25 near its upper end and a shoulder 26 at its lower end, the latter being a nut threading on the lower end of the rod.

27 is a direct shock resisting spring interposed between the shoulder 25 and the bracket 14. 28 is an indirect shock or rebound preventing spring interposed between the shoulder 26 and the bracket 14. As here shown, the opposing ends of the springs bear against abutments 29 slidable horizontally in the passage in the bracket 14 and bearing against stops or braces 30 extending transversely through the passage of the bracket 14 in the front and the rear of the rod 23, the stops having sleeves 31 on which the abutments bear. The abutments are horizontally slidable in order to permit the rod 23 to tilt, during the action of the spring 1, about a horizontal axis located between the ends of the rod 23. The abutments 29 are bent up U shape in cross section out of sheet metal blanks and have perforations 32 in their intermediate portions through which the rod 23 extends. The brackets 14 and 17 are also formed out of sheet metal blanks, the bracket 14 being bent to form the opposing sides or flanges 15 and the passage in which the abutments 29 are located.

In motor cars, as the Ford cars, having springs extending transversely of the car and suspended at three points, the spring floats sidewise and as the body is fastened to the center of the rear spring, the body rolls with the spring. The side motion is increased when the car is unevenly loaded. In use, my shock absorber steadies the body frame of the car and alleviates the rebound action.

When the main or rear spring is deflected, the upper or shock receiving spring 27 reinforces and steadies the main spring, and when the main spring moves back toward its normal position, the rebound spring 28 slows up the movement gradually until the main spring is in its normal position.

This shock absorber is particularly advantageous in that it is particularly simple and economical in construction and can be readily applied to cars to which it is designed to be applied.

What I claim is:

1. A shock absorber for motor vehicles having a main spring which extends transversely thereof and which is connected at its opposite ends to the axle and intermediate of its ends to the body of the vehicle, the axle construction including a sectional differential gear casing, the sections of which are secured together by bolts passing through peripheral projections, the shock absorber including a bracket having a flange for lapping the projections of the differential gear casing, the flange of the bracket being also provided with holes for receiving the bolts holding the sections of the differential gear casing together, and shock and rebound preventing means connecting the bracket and the vehicle spring, substantially as and for the purpose described.

2. A shock absorber for motor vehicles having a main spring which extends transversely thereof and which is connected at its opposite ends to the axle and intermediate of its ends to the body of the vehicle, the shock absorber including a bracket having means for securement to the central part of the spring, a second bracket for securement to the axle, and shock and rebound preventing means between the brackets, the latter means including a rod pivoted at its upper end to the former bracket and movable endwise through the latter bracket and having a rocking movement about a transverse axis located between its ends, and springs encircling the rod above and below the latter bracket and acting in opposite directions on the rod and the bracket, substantially as and for the purpose set forth.

3. A shock absorber including a bracket for securement to a portion of a vehicle, perforated abutments horizontally slidable in the bracket, a rod extending through the perforated abutments and having means at its upper end for connection to another part of the vehicle, and springs encircling the rod above and below the bracket and acting at their outer ends in opposite directions on the rod, and bearing at their opposing ends on said abutments respectively, substantially as and for the purpose described.

4. A shock absorber including a bracket for securement to a portion of the vehicle, the bracket being formed with a vertical passage, stops extending transversely through the passage, perforated abutments slidable horizontally in the passage above and below the stops, a rod extending through the perforated abutments and between the stops and having means at its upper end for connection to another part of the vehicle, and springs encircling the rod above and below the bracket and acting at their outer ends in opposite directions on the rod and bearing at their opposing ends on said abutments respectively, substantially as and for the purpose specified.

5. A shock absorber including a bracket for securement to a body of a vehicle, a second bracket for connection to the axle of the vehicle, horizontally slidable abutments associated with the second bracket and facing upwardly and downwardly respectively, a rod pivoted at its upper end to the first bracket and having a shoulder near its upper end, the rod being slidable through the abutments and having a shoulder at its lower end, and oppositely acting compression springs interposed between the abutments and the shoulders on the rod, substantially as and for the purpose set forth.

6. A shock absorber for motor vehicles having a main spring extending transversely thereof and connected at its opposite ends to the axle casing and intermediate of its ends to the body of the vehicle, the shock absorber including a bracket having means at one end for connection to the central part of the spring, a second bracket including opposing sides for connection to the sections of the differential gear casing, abutments slidable horizontally between the sides of the bracket and facing upwardly and downwardly respectively, a rod pivoted at its upper end to the front end of the first bracket and having a shoulder at its upper end, the rod extending through the abutments and between the sides of the second bracket and having a shoulder at its lower end and oppositely acting compression springs interposed between the abutments and the shoulders on the rod, substantially as and for the purpose described.

7. A shock absorber for motor vehicles having a main spring extending transversely thereof and connected at its opposite ends to the axle casing and intermediate of its ends to the body of the vehicle, the shock absorber including a bracket bent from a sheet metal blank to form opposing sides for lapping the sections of the differential gear case and for securement thereto, a pair of stops interposed between the said sides, a second bracket bent into the form of a channel for securement to the body at the central part of the spring with its channel facing downwardly, oppositely arranged abutments formed U shape in cross section slidably fitting between the sides of the first bracket with the edges of the sides engaging the stops, the abutments being slidable horizontally, the intermediate webs of the abutments being perforated, a rod pivoted to the second bracket between the side flanges thereof, the rod ending through the perforations of the abutments and between the stops, and having shoulders near its upper and lower ends, and springs encircling the rod between the abutments and the shoulders, substantially as and for the purpose specified.

In testimony whereof, I have hereunto signed my name in the presence of two attesting witnesses, at Syracuse, in the county of Onondaga, in the State of New York, this 12th day of February, 1914.

ALEXIS R. PRIBIL.

Witnesses:
S. DAVIS,
CHAS. H. YOUNG.

Copies of this patent may be obtained for five cents each, by addressing the "Commissioner of Patents, Washington, D. C."